United States Patent
Van Voorthuizen et al.

(10) Patent No.: US 6,435,228 B1
(45) Date of Patent: Aug. 20, 2002

(54) DRILLING APPARATUS FOR FILLED POTS DURING MOVEMENT

(75) Inventors: Albertus J. Van Voorthuizen, Puttershoek; Pieter Visser; Anthony Visser, both of 's-Gravendeel, all of (NL)

(73) Assignee: Visser 'S-Gravendeel Holding B.V., 's-Gravendeel (NL)

( * ) Notice: Subject to any disclaimer, the term of this patent is extended or adjusted under 35 U.S.C. 154(b) by 0 days.

(21) Appl. No.: 09/603,915

(22) Filed: Jun. 26, 2000

(30) Foreign Application Priority Data

Jun. 26, 1999 (NL) .............................................. 1012438

(51) Int. Cl.⁷ .............................................. B65B 43/42
(52) U.S. Cl. ........................ 141/129; 141/135; 141/137
(58) Field of Search .................................. 141/129, 135, 141/137, 270, 177, 181, 73; 198/817, 867.08, 803.11, 473.1

(56) References Cited

U.S. PATENT DOCUMENTS

| | | | | |
|---|---|---|---|---|
| 2,884,022 A | * | 4/1959 | Geary | |
| 3,605,921 A | * | 9/1971 | Mayer | |
| 3,726,041 A | * | 4/1973 | Ota et al. | |
| 3,782,033 A | * | 1/1974 | Hickerson | |
| 4,020,881 A | * | 5/1977 | Nothen | 141/131 |
| 4,490,961 A | * | 1/1985 | Raque | |
| 4,498,358 A | * | 2/1985 | Raque et al. | 141/137 |
| 4,528,796 A | | 7/1985 | Lemaire | |
| 4,678,015 A | * | 7/1987 | Raque et al. | 141/137 |
| 4,678,378 A | * | 7/1987 | Koczarski | |
| 4,697,623 A | | 10/1987 | Bouldin et al. | |
| 5,134,971 A | * | 8/1992 | Krienke et al. | 198/817 |
| 5,284,190 A | * | 2/1994 | Jones et al. | 141/129 |
| 5,394,670 A | | 3/1995 | Visser | |
| 5,641,008 A | * | 6/1997 | Ellis | 141/129 |
| 5,651,401 A | * | 7/1997 | Cados | |
| 6,145,552 A | * | 11/2000 | Price et al. | 141/137 |

FOREIGN PATENT DOCUMENTS

| | | |
|---|---|---|
| DE | 41 10 432 | 10/1992 |
| EP | 0 893 374 | 1/1999 |
| GB | 1 405 214 | 9/1975 |
| JP | 08037938 A * | 2/1996 |

* cited by examiner

Primary Examiner—Gregory L. Huson
Assistant Examiner—Khoa D. Huynh
(74) Attorney, Agent, or Firm—Banner & Witcoff, Ltd.

(57) ABSTRACT

An apparatus for successively subjecting objects to a processing, comprising a transporting device for transporting the objects; a feed device for feeding the objects for processing to the transporting device; at least one processing device for processing the objects transported by the transporting device; and a discharge device for discharging the objects from the transporting device, wherein the transporting device is adapted to transport the objects for processing with a uniform linear movement and wherein the processing device is adapted to perform the processing on the objects during the uniform movement.

17 Claims, 5 Drawing Sheets

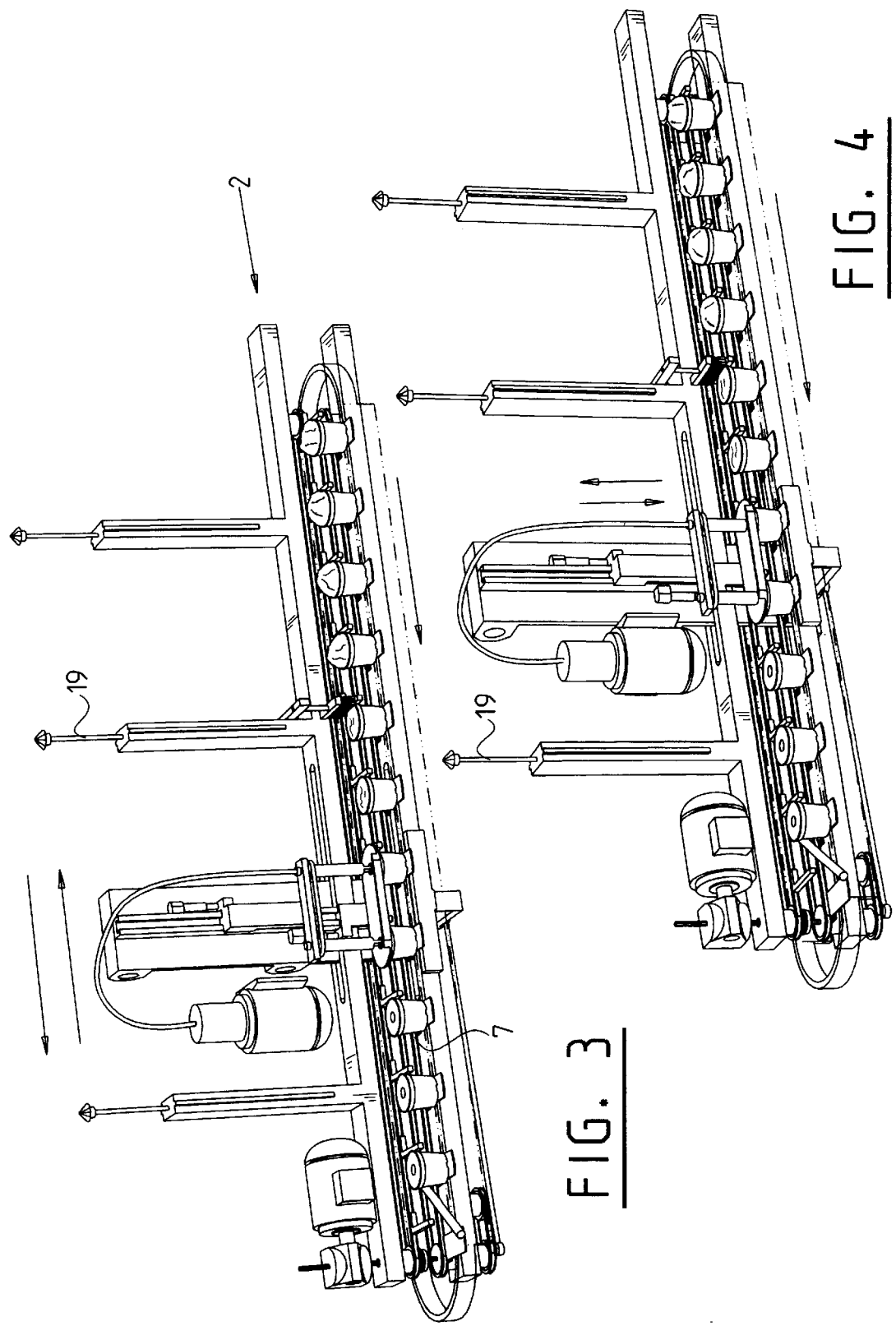

DRILLING APPARATUS FOR FILLED POTS DURING MOVEMENT

FIELD OF THE INVENTION

The invention relates to an apparatus for successively subjecting objects to a processing, comprising:

a transporting device for transporting the objects;

a feed device for feeding the objects for processing to the transporting device;

at least one processing device for processing the objects transported by the transporting device; and a discharge device for discharging objects from the transporting device.

BACKGROUND OF THE INVENTION

Such apparatuses are generally known. Such prior art apparatuses usually suffer from the drawback that they are less suitable for transporting objects at a high speed, particularly when the objects are filled during the processing or the objects easily disintegrate of their own accord as a result of forces acting on the objects.

BRIEF DESCRIPTION OF THE INVENTION

The object of the present invention is to provide such an apparatus which can also be applied in the case of objects which easily disintegrate, tip over and so on, and which apparatus can nevertheless be used at a high speed.

This objective is achieved in that the transporting device is adapted to transport the objects for processing with a uniform linear movement and in that the processing device is adapted to perform the processing on the objects during the uniform movement.

Owing to the fact that the objects are propelled with a linear uniform movement, the forces exerted on the object are minimal.

According to a first preferred embodiment the processing device comprises at least one processing element which is adapted to perform a reciprocal movement along a path extending parallel to the transporting device and to process at least one object during the movement.

These measures have the result that the processing of the objects, which must extend over some period of time, can take place without stopping the transporting device. Stopping of the transporting device would after all disrupt the uniform movement.

It is noted here that it is of course possible to process the objects with a processing which is not restricted to a particular location. An example hereof is the filling of pots with culture material, for instance soil.

According to another preferred embodiment the processing element is adapted to process at least two objects simultaneously.

This has the result that the capacity of the apparatus is greatly increased when, as in many situations, the processing takes a rather considerable time.

According to yet another preferred embodiment the transporting device is provided with drive means which are adapted to drive the processing element with a reciprocal movement. An autonomous movement of the processing means is hereby obtained, wherein it is not necessary for the objects for processing to carry the processing element along with them. This would also result in forces acting on the objects.

According to yet another preferred embodiment the processing device comprises a fixedly disposed part which is connected to the processing element by means of a flexible coupling. This provides the option of fixed arrangement of the heavy, force-generating elements of the processing device, while the actual processing part carrying out the process on the objects can take a lighter form; this latter must after all perform a reciprocal movement.

According to yet another preferred embodiment the processing element is adapted to perform a movement extending substantially perpendicularly of the direction of movement of the transporting device between an active position during the co-displacement with the transporting device and a passive position during the movement opposed to the direction of movement of the transporting device.

This results in a simple, structurally attractive solution.

Other attractive preferred embodiments are stated in the remaining sub-claims.

BRIEF DESCRIPTION OF THE DRAWINGS

The present invention will be elucidated hereinbelow with reference to the annexed figures, in which:

FIG. 3 is a perspective detail view of a component of the present invention in a first position;

FIG. 4 shows a view corresponding with FIG. 3 in a second position;

DETAILED DESCRIPTION OF THE INVENTION

Figure 5:
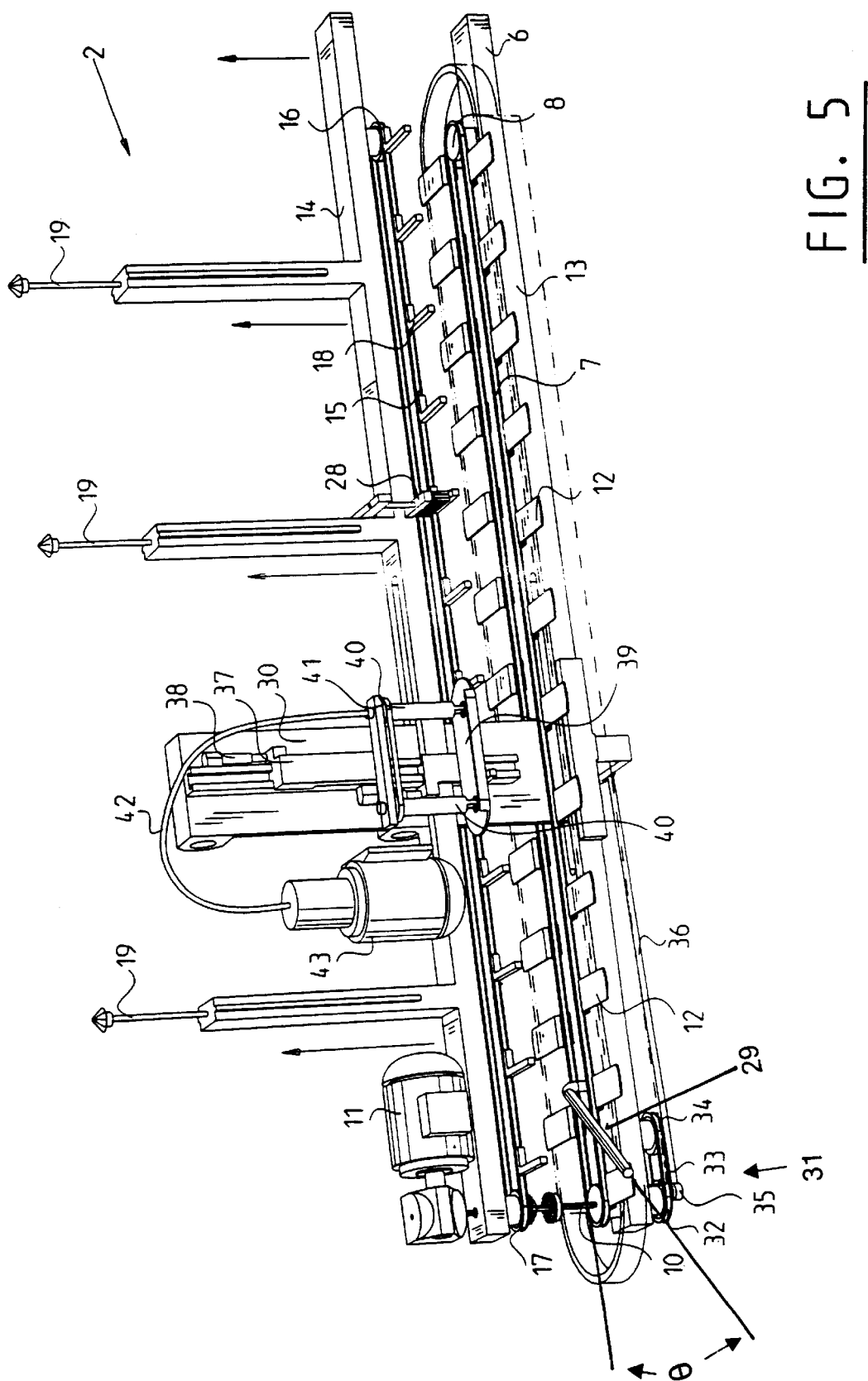
FIG. 5 shows a view corresponding with FIGS. 3 and 4 elucidating a following aspect.

The figures show an apparatus 1 for filling pots with potting soil. For this purpose, the apparatus comprises a transporting device designated in its entirety with 2, a feed device 3 for feeding the pots for filling; a soil pouring device 4, a tamping and drilling device 5 and a discharge device not shown in the drawing, but which could comprise, for example, a conveyor The transporting device is shown most clearly in FIGS. 3, 4 and 5. Transporting device 2 comprises a first conveyor chain 7 which is trained around two chain wheels 8, 9. Chain wheel 9 is arranged under vertical shaft 10 driven by an electric motor 11.

Carrying plates 12 are arranged extending substantially horizontally and at an equal mutual distance on the first conveyor chain 7. Carrying plates 12 can slide over a support rail 13 arranged around first conveyor chain 7 but extending at a slightly lower level. Support rail 13 herein follows the contour of the chain. With the exception of electric motor 11, all these components are arranged on a part of frame 6.

The transporting device further comprises a second conveyor chain 15 arranged on an auxiliary frame 14 and trained round two chain wheels 16,17. Chain wheel 17 is herein arranged on shaft 10 and is likewise driven by electric motor 11. Pusher elements 18 are arranged on second conveyor chain 15 at the same pitch as carrying plates 12.

Figure 1:
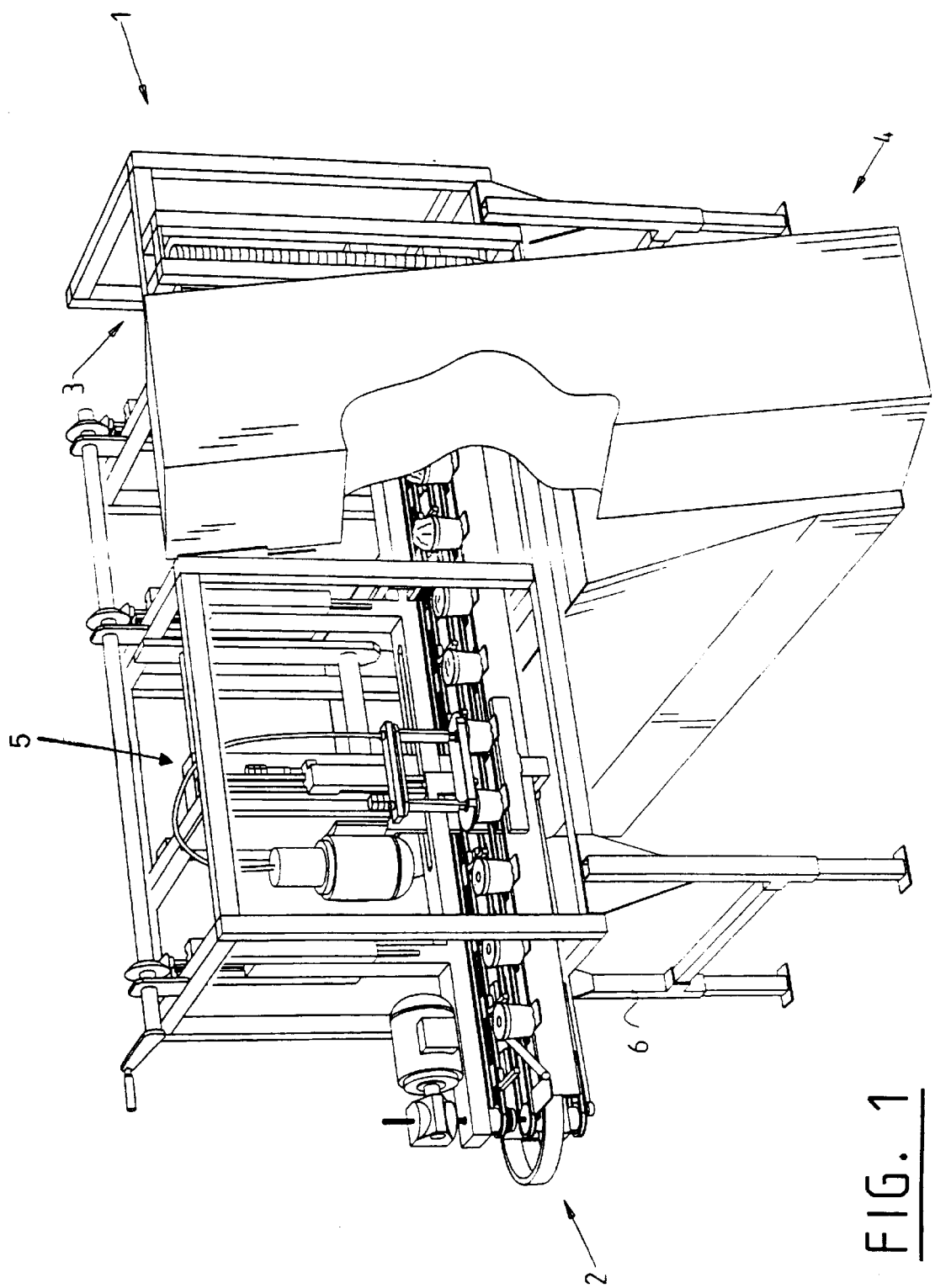
FIG. 1 shows a partly broken-away perspective view of an apparatus according to the invention.
Figure 2:
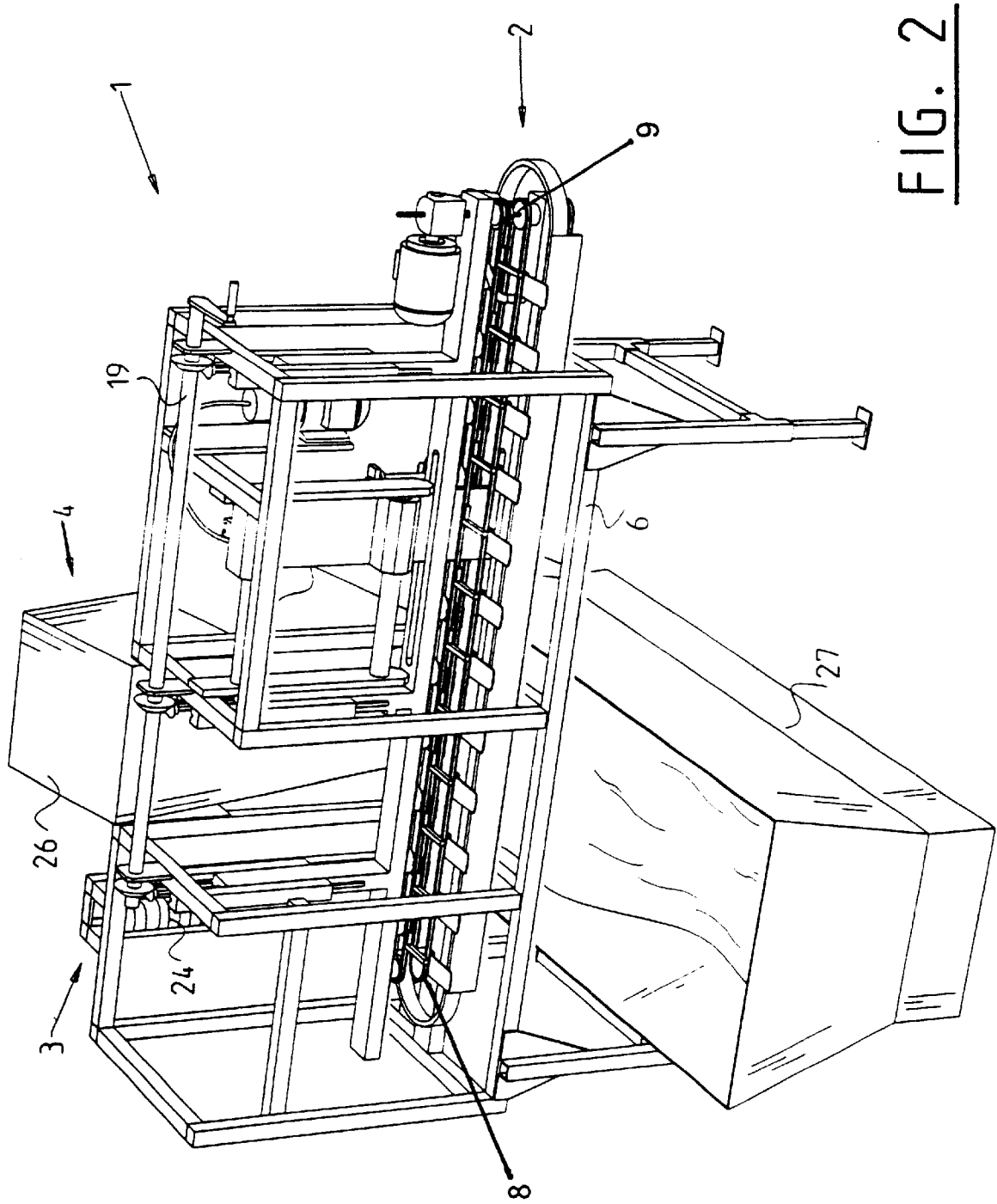
FIG. 2 shows a perspective view of the apparatus according to the invention from another side.

Auxiliary frame 14 is herein movable in vertical direction relative to frame 6. Use is made for this purpose of an adjusting device 19 as shown in FIG. 2 with which the auxiliary frame can be adjusted in the height.

Figure 6:
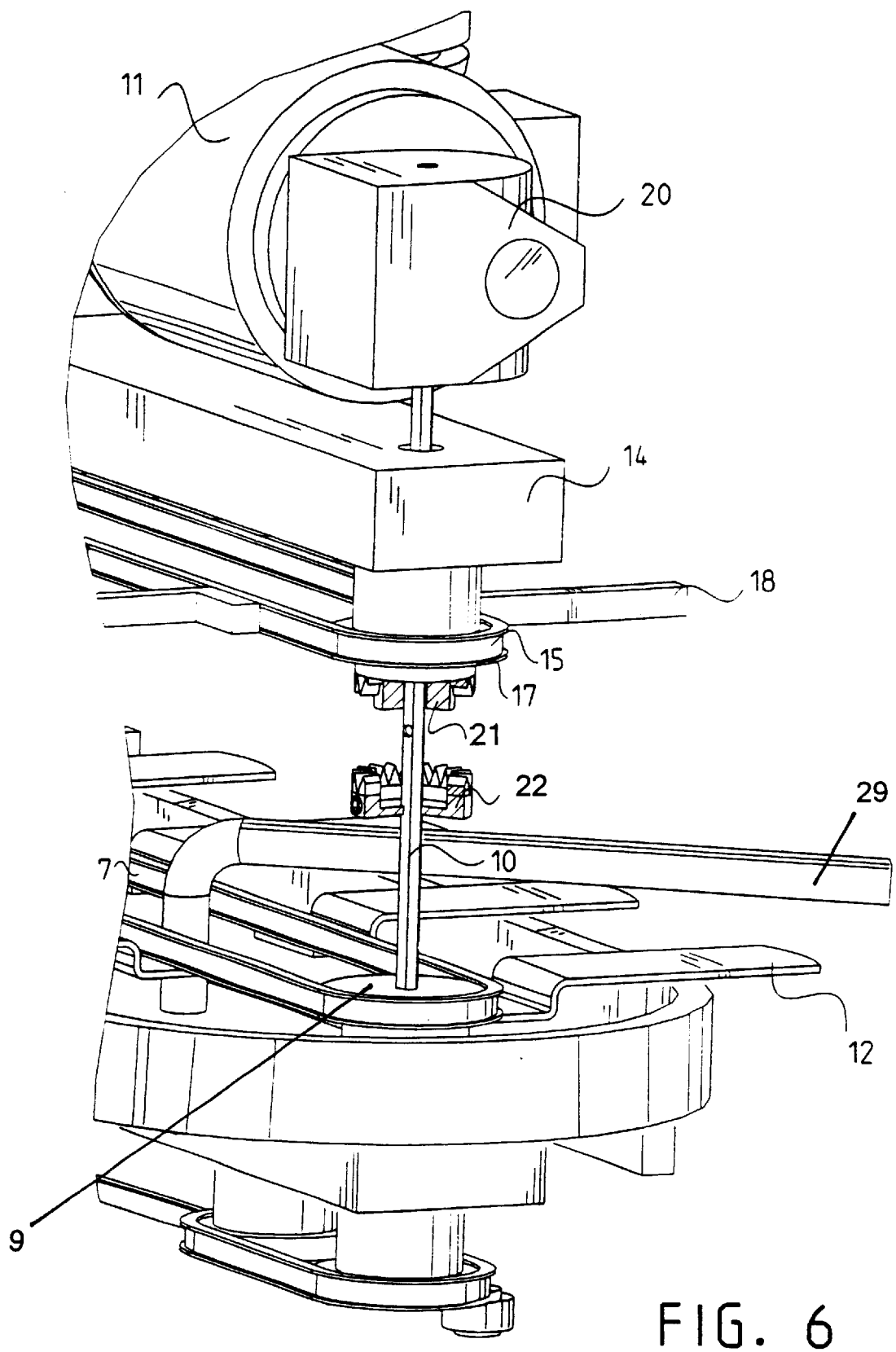
FIG. 6 is a partly broken-away perspective detail view of the apparatus.

As best seen in FIG. 6, shaft 10 is formed by a hexagonal shaft. This is connected by means of a transmission 20 to electric motor 11. It is herein possible to displace the position of pusher elements 18, which are mounted on the second conveyor chain 15, relative to the carrying plates 12 mounted on the first conveyor chain.

Chain wheel 17 is arranged for this purpose for free rotation on shaft 10. The wheel is provided on its underside with a coupling piece 21 which is provided on its bottom with teeth, while a second coupling piece 22, which is freely movable in vertical direction on shaft 10 but which is fixedly connected for rotation to shaft 10, can be placed in engagement with first coupling piece 21.

The two coupling pieces 21, 22 are normally in mutual engagement, although in order to adjust the mutual position between pusher elements 18 and carrying plates 12 the coupling piece 22 can be carried downward temporarily. This provides the possibility of processing objects of different dimensions, particularly pots of different dimensions, with the transporting device.

As shown particularly in FIG. 2, a stack of pots 24 is placed in feed device 3. Although not shown in detail in the drawings, feed device 3 can comprise, for example, a conveyor belt mounted onto frame 6 and on which can be placed stack of pots 24. Such a conveyor belt could then be mounted on a tiltable auxiliary frame with which the conveyor belt and the series of pots 24 placed thereon can be brought into a vertical position. By means of an individualizing device, not shown in the drawings, the separate pots comprising stack of pots 24 can be placed one by one onto carrying plates 12. This feed device can be embodied in numerous ways; this device is of course necessary for the functioning of the apparatus according to the present invention but it includes no exceptional technical measures; it can be replaced by a different type of device.

The pots 24 placed by the feed device onto transporting device 2 then pass through a soil pouring device 4. This is formed by a conveyor belt, not shown in the drawing, placed in a housing 26 and a bin 27 placed beneath the transporting device. The conveyor belt carries upward the soil present in bin 27 and pours it out over the transported pots. The part of the soil which does not fall into the pots once again drops through the apparatus back into the bin 27. An excess of soil is removed by a wiper 28 arranged for this purpose.

The tamping and drilling device 5 will now be discussed.

The tamping and drilling device 5 comprises a slide 30 movable in horizontal direction along auxiliary frame 14. Slide 30 is driven in horizontal direction by a crank-connecting rod mechanism 31. on the underside of shaft 10 is herein arranged a chain wheel 32 which is connected by means of a chain 33 to a subsequent chain wheel 34 to which is connected a crank 35. Connected to crank 35 is a rotating rod 36 which is connected on its other end to a downward extending part of slide 30.

With the thus described construction is achieved that the carriage executes a reciprocating movement in the direction of the moving carrying plates 12, so that elements placed on the carrying plates can be processed "on the fly" with a processing element mounted on slide 30. The dimensioning of the drive device is of course such here that during a large part of the movement along the relevant route the slide 30 co-displaces as uniformly as possible with carrying plates 12.

A carriage 37 is arranged movably in vertical direction on slide 30. Carriage 37 can be moved in vertical direction relative to slide 30 by means of a linear moving element of for instance a pneumatic cylinder 38. With a relevant control it is possible to move carriage 37 into its lowest position during this part of the horizontal movement of the slide, while during the return stroke carriage 37 is situated in its uppermost position.

In order to perform a process on the transported flower pots, which in the meantime have been filled with culture material such as soil, a pressing plate 39 is mounted on carriage 37. Pressing plate 39 ensures that a "head" of culture material present on the pots is depressed within the pot.

It is of further importance here that small plants or cuttings can subsequently be placed in the pot by an automatic planting device. Holes must be drilled into the soil for this purpose. Two drills 49 are arranged herefor on carriage 37. These are mutually connected by a chain or belt 41, while one of the drills 40 is driven by means of a flexible drive shaft 42. This latter is herein connected to an electric motor 43 arranged fixedly on auxiliary frame 14.

It is thus possible to process the flower pots carried along on carrying plates 12 by tamping the soil present therein and providing it with a hole.

In the present embodiment there are two drills 40, so that two flower pots can be processed simultaneously. It will be apparent that it is possible to process other numbers of flower pots, for instance one or three.

It will further be apparent that it is possible to perform other processes; the present invention is not limited to flower pots; it relates rather to a general configuration which can be adapted to the products for processing.

Finally, the flower pots are moved by means of an inclining guide rail 29 at a small angle from the carrying plates 12 to a conveyor belt extending parallel to the transporting device (not shown).

Of importance here is that the forces to which the flower pots are subjected are as small as possible. There is otherwise the danger of the flower pots falling over, whereby the whole production process would be disrupted. It is further of importance herein that the maintaining of the low level of forces be combined with a high speed; it is important that a large production capacity be sustained.

If as described above the apparatus according to the invention is used to fill flower pots with culture material and to subsequently arrange a hole in the culture material, it will be apparent that a plant must be arranged in the hole. The plant can then take the form of a seed, a cutting or other form of a plant.

Placing of a cutting in the hole requires a rather complicated machine. It is also possible herein to place this machine on a slide executing a reciprocating movement, in the same manner as the tamping and drilling device. It is herein even possible to place the planting machine on the same slide as the tamping and drilling device.

Only when the planting operation takes place very rapidly could use be made of a stationary machine. It is otherwise also possible to place the planting machine on a separate conveyor belt.

Although the apparatus is described on the basis of a pot-filling machine, it will be apparent that it can also be applied with other machines.

What is claimed is:

1. A filled-pot drilling apparatus for drilling material that has been placed into pots, comprising:

a transporting device for transporting pots;

a feed device for feeding the pots to the transporting device; and at least one processing device for drilling material that has been placed into pots transported by the transporting device, wherein the transporting device transports the pots during drilling with a uniform movement in a substantially straight line, the processing device performs a reciprocal movement along a path parallel to said transporting device and said substantially straight line movement and drills the material in at least one pot during said reciprocal movement, and the processing device comprises a drilling element driven by a flexible drive shaft.

2. An apparatus as claimed in claim 1, wherein the drilling element simultaneously drills the material in at least two pots.

3. An apparatus as claimed in claim 1, wherein the transporting device comprises a drive device which also drives the processing device with a reciprocal movement.

4. An apparatus as claimed in claim 3, wherein the drive device is adapted to drive the processing device through a crank-connecting rod mechanism coupled to the drive device.

5. An apparatus as claimed in claim 1, wherein the drilling element performs a movement substantially perpendicular to said substantially straight line movement, said perpendicular movement comprising an active component during the processing device's co-displacement with the transporting device and a passive component during the processing device's movement opposed to the direction of movement of the transporting device.

6. An apparatus as claimed in claim 1, wherein the transporting device comprises at least one flexible carrier with a closed structure trained around two reversing elements and extending at least partly in a straight line.

7. An apparatus as claimed in claim 6, wherein the transporting device further comprises carrying surfaces arranged on the carrier in a fixed pitch arrangement and the apparatus further comprises a support rail arranged under the path to be traveled by the carrying surfaces.

8. An apparatus as claimed in claimed in claim 6 wherein said flexible carrier comprises a chain.

9. An apparatus as claimed in claimed in claim 6 wherein said flexible carrier comprises a toothed belt.

10. An apparatus as claimed in claim 1, further comprising a guide element for guiding pots from the transporting device after drilling, wherein the guide element extends at a small angle relative to the direction of movement of the transporting device.

11. An apparatus as claimed in claim 1, wherein the apparatus fills pots with loose culture material, tamps the culture material into the pots and drills a hole in the culture material.

12. A drilling apparatus for drilling material that has been placed into pots, comprising:

transporting device for transporting pots, the transporting device comprising:

a first flexible carrier with a closed structure trained around two reversing elements and extending at least partly in a straight line, carrying surfaces arranged on the first flexible carrier in a fixed pitch arrangement, and pusher elements mounted on a second flexible carrier at the same fixed pitch arrangement as the carrying surfaces;

a support rail arranged under the path to be traveled by the carrying surfaces;

a feed device for feeding the pots to the transporting device; and at least one processing device for drilling material that has been placed into the pots transported by the transporting device, wherein the transporting device transports the pots during drilling with a uniform movement in a substantially straight line, the processing device performs a reciprocal movement along a path parallel to said substantially straight line movement and drills material in at least one pot during said reciprocal movement, and the processing device comprises a processing element driven by a flexible drive shaft.

13. An apparatus as claimed in claim 12, wherein the second flexible carrier is height-adjustable.

14. An apparatus as claimed in claim 12, wherein the flexible carriers are guided around a shaft and driven by a common drive device.

15. An apparatus as claimed in claim 14, wherein at least one of the flexible carriers is disengageable relative to the drive device.

16. An apparatus as claimed in claim 15, wherein the second flexible carrier is mounted on an auxiliary frame which is movable in a vertical direction.

17. An apparatus as claimed in claim 16, wherein the processing device is mounted on the auxiliary frame.

* * * * *

UNITED STATES PATENT AND TRADEMARK OFFICE
CERTIFICATE OF CORRECTION

PATENT NO. : 6,435,228 B1
DATED : August 20, 2002
INVENTOR(S) : Albertus J. Van Voorthuizen et al.

It is certified that error appears in the above-identified patent and that said Letters Patent is hereby corrected as shown below:

<u>Column 6,</u>
Line 9, -- a -- has been inserted before the word "transporting".

Signed and Sealed this

Twenty-fifth Day of March, 2003

JAMES E. ROGAN
*Director of the United States Patent and Trademark Office*